United States Patent [19]

Higashiguchi et al.

[11] Patent Number: 4,551,767

[45] Date of Patent: Nov. 5, 1985

[54] STATIONARY-PICTURE TRANSMISSION SYSTEM

[75] Inventors: Toshiaki Higashiguchi; Michiaki Sonoda, both of Tokyo, Japan

[73] Assignee: Nippon Electric Co., Ltd., Tokyo, Japan

[21] Appl. No.: 462,635

[22] Filed: Jan. 31, 1983

[30] Foreign Application Priority Data

Jan. 30, 1982 [JP]  Japan .................................. 57-13981

[51] Int. Cl.⁴ ............................................ H04N 1/32
[52] U.S. Cl. .................................... 358/257; 358/264
[58] Field of Search ............... 358/257, 268, 147, 146, 358/264, 85

[56] References Cited

U.S. PATENT DOCUMENTS 4,254,439  3/1981  Fowler et al. ....................... 358/268

Primary Examiner—John C. Martin
Assistant Examiner—Edward L. Coles
Attorney, Agent, or Firm—Sughrue, Mion, Zinn, Macpeak, and Seas

[57] ABSTRACT

A television signal transmission system with stationary-picture transmission capabilities including the ability to stop picture transmission at any point within a picture frame. The picture stop feature is realized by inserting a control code within each horizontal scanning interval. The control code signals any of several instructions, including start, stop, scan and line control header instructions. The stop control code is generated in the horizontal scanning interval corresponding to the stop point in the frame transmission to thereby inhibit further picture transmission. Picture transmission is restarted by the generation of a scan control code.

8 Claims, 4 Drawing Figures

STATIONARY-PICTURE TRANSMISSION SYSTEM

BACKGROUND OF THE INVENTION

This invention relates to a television signal transmission system and more particularly to a stationary-picture transmission system which is capable of transmitting a television signal over a narrowband transmission line.

In a conventional stationary-picture transmission system such as the one described in an article entitled "Development of Color Freeze-picture Transmission System" published in NEC RESEARCH & DEVELOPMENT, No. 43, October, 1976 pp 1–13 or in the U.S. Pat. No. 4,164,760 entitled "STATIONARY-PICTURE TRANSMISSION SYSTEM UTILIZING A DIGITAL MEMORY TECHNIQUE" issued to Inaba et al. and assigned to the present assignee, a television video signal of one frame or one field produced by a pick-up tube at a television standard scanning rate is stored in a one-frame or one-field memory. The stored signal is read out at a lower scanning rate in order to transmit the signal over a narrowband transmission line such as a public telephone line to a receiving end. At the receiving end, the received signal is stored in a one-frame or one-field memory at the lower scanning rate and then read out at the television standard scanning rate.

The stationary-picture transmission over the public telephone line has been used in a telephone conference system in which a conference is held between persons located at a distance from each other. In the telephone conference system, visual data representing not only the persons but also documents to be used in the conference are transmitted as the narrowband stationary-picture signals. In the document data transmission, it happens that a presently transmitting document is desired to be compared with a previously transmitted document. In this case, it is desired to stop the transmitting document at any time point during one complete picture transmission. In the conventional stationary-picture transmission system, however, the stationary-picture is transmitted in a unit of one complete picture, i.e., one-frame by one-frame. In other words, it is impossible to stop the transmission at any time point within one complete picture transmission.

SUMMARY OF THE INVENTION

It is, therefore, an object of this invention to provide a stationary-picture transmission system in which a transmission can be stopped at any time point during one complete picture transmission.

According to this invention, there is provided a stationary-picture transmission system in which a first control code is inserted in transmitting video data at a period equal to a horizontal scanning period. When it is desired to temporarily stop the transmission, a second control code is inserted at a portion corresponding to that for the first control code, and then the transmission is stopped. When the restart of the transmission is desired, a third control code is transmitted and then the video data with the first control code is transmitted.

The foregoing and other objects and features of this invention will be more fully understood from the following description of an embodiment of this invention take in conjunction with the accompanying drawings, wherein:

DETAILED DESCRIPTION OF THE PREFERRED EMBODIMENT

This invention will be described in detail with reference to the accompanying drawings in which, for simplicity of the description, there is omitted means for encoding an analogue video signal into a digital video signal and for storing it in a digital memory at the transmitting end in FIG. 1, and means for reading out the digital video signal from a digital memory and for decoding the digital video signal to the analogue video signal at the receiving end in FIG. 2.

Figure 1:
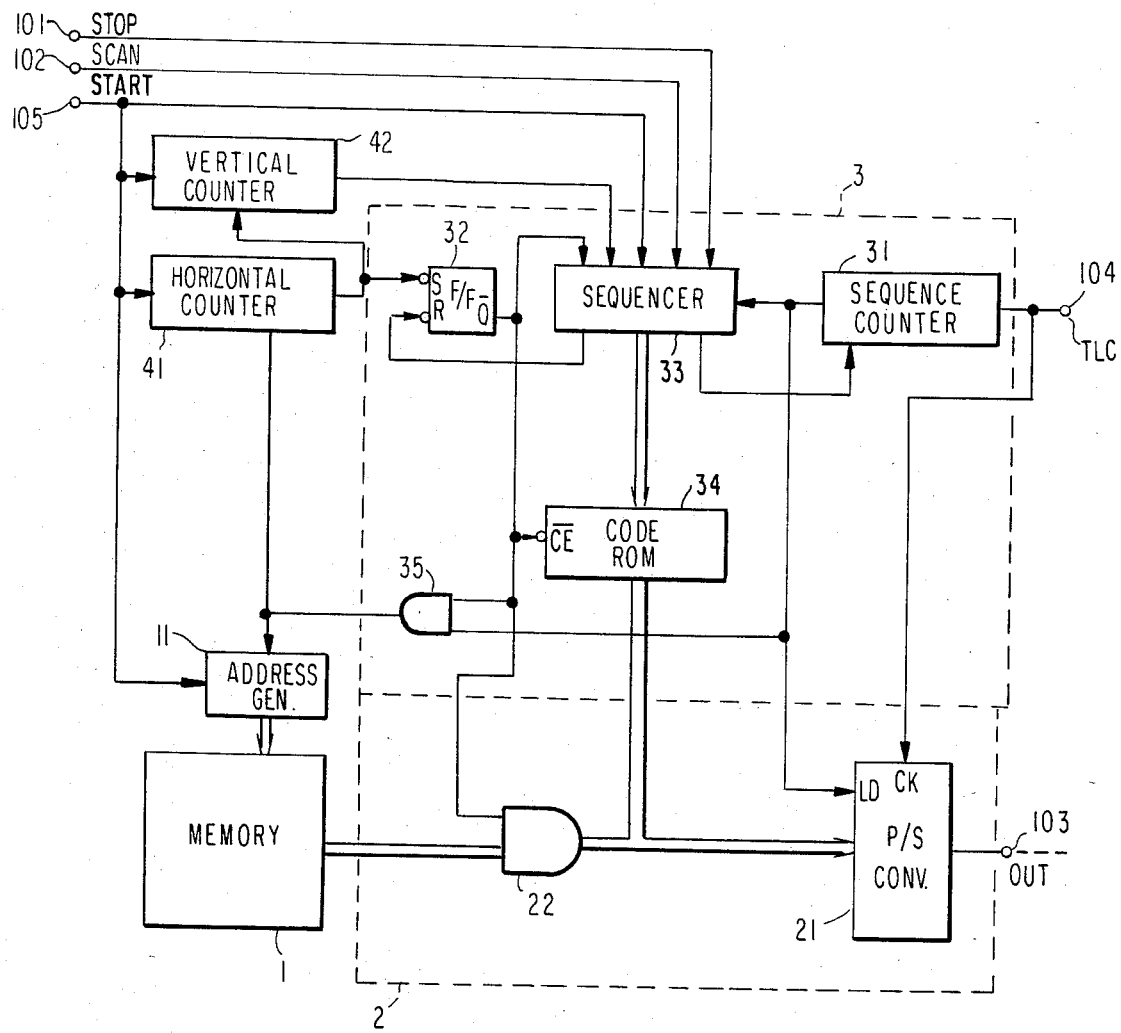
FIGS. 1 and 2 are block diagrams of the transmitting and receiving ends, respectively, of an embodiment of this invention.

Referring to FIG. 1, the transmitting end comprises stationary-picture memory 1 in which a digital video data representing a stationary-picture to be transmitted is stored, a transmitting control code inserter 2 for inserting control codes into the video signal every horizontal scanning period, a transmitting controller 3 for controlling the memory 1 and the inserter 2, a horizontal counter 41 and a vertical counter 42.

A transmission line clock TLC having a transmission bit rate for a transmission line is supplied from a terminal 104 to a sequence counter 31 in the controller 3. The sequence counter 31 is a ⅛ counter for dividing the clock TLC by a bit-number (8) equal to the number of bits in one word of the video data (one word = 8 bits in this embodiment) to produce a word pulse. The word pulse is supplied to the picture memory 1 through an address generator 11 to read out the 8-bit parallel video data one-word by one-word. The read out parallel video data is loaded in a parallel-to-serial converter 21 in response to the word pulse from the counter 31. The parallel-to-serial converter 21 is supplied with the clock TLC and converts the parallel video data into serial video data having the transmission bit rate. The serial video data from the converter 21 is transmitted from a terminal 103 at the transmission bit rate over the narrowband transmission line to the receiving end.

Figure 3A:
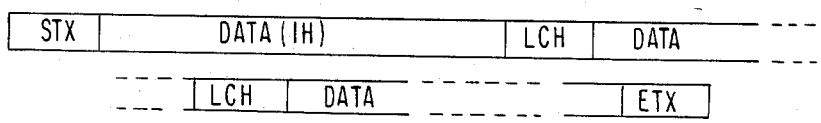
FIGS. 3A and 3B show data formats of transmitting data to be transmitted from the transmitting end shown in FIG. 1 to the receiving end shown in FIG. 2.
Figure 3B:
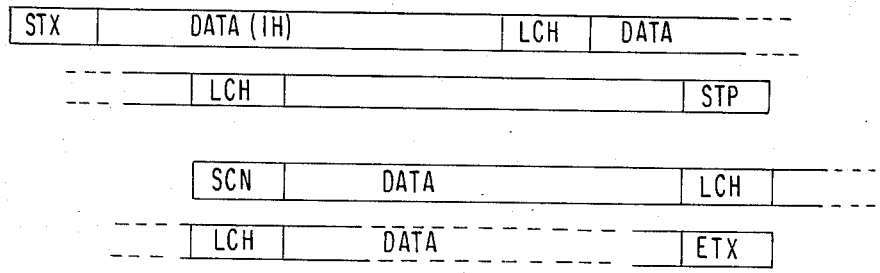

The word pulse from the counter 31 is also applied to the horizontal counter 41. When the counted content equals the word number for one horizontal scanning period (1H), the counter 41 generates a carry pulse, which is supplied to a set terminal of a flip-flop 32 to set the flip-flop. When the flip-flop 32 is set, a sequencer 33 composed of a latch circuit and a read-only-memory (ROM) makes a code ROM 34 produce a line control header code (LCH) of 32 bits for four word-periods. At the same time, the output $\overline{Q}$ of the flip-flop 32 is applied to AND circuits 35 and 22 to inhibit passages of the word pulse and the read out video data for four words-periods, respectively, whereby the code LCH is supplied to the converter 21. Thus, the code LCH is inserted between the transmitted video data during each horizontal scanning period as shown in FIGS. 3A and 3B.

When the code LCH has been inserted, i.e., after the time lapse of four word-periods, the sequencer 33 supplies a reset pulse to the flip-flop 32, whereby the read out video data is supplied from the memory 1 to the converter 21 for the following 1H period.

The carry pulse from the horizontal counter 41 is also supplied to the vertical counter 42. When the carry pulses for the one complete picture period (one frame) have been applied, the vertical counter 42 generates a frame pulse, which is applied to the sequencer 33 to make the code ROM 34 produce a code ETX (of 32 bits) representing an end of the transmission. Thus, the code ETX is inserted at the end of the video data of one complete picture as shown in FIGS. 3A and 3B.

At the start of the transmission, a start signal is supplied from a terminal 105 to the address generator 11, the horizontal and vertical counters 41 and 42, and the sequence counter 31 to reset them, and to the set terminal of the flip-flop 32. The start signal is also applied to the sequencer 33 to make the code ROM 34 produce a start code STX of 32 bits for four word-periods. Thus, the start code STX is inserted at the start portion of the video data of the complete picture as shown in FIGS. 3A and 3B.

When it is desired to temporarily stop the transmission at any time point, a stop signal is supplied from a terminal 101 to the sequencer 33, which makes the code ROM 34 produce a stop code STP of 32 bits for four word-periods after the carry pulse is supplied to the set input of flip-flop 32. When the stop signal is supplied, the sequencer 33 does not produce the reset pulse to the flip-flop 32 even after the time lapse of four word-periods. Thus, after the stop code STP is inserted, the transmission is stopped as shown in FIG. 3B.

When it is desired to restart the transmission, a scan signal is supplied from a terminal 102 to the sequencer 33, which makes the code ROM 34 produce a scan code SCN of 32 bits for four word-periods. After the time lapse of four word-periods, the sequencer 33 generates the reset pulse, which is supplied to the reset terminal of the flip-flop 32, whereby the transmission of the video data is restarted as shown in FIG. 3B.

In this embodiment, the following code patterns are used as the control codes:

STX—"00001111011111100111111010011001";
LCH—"00001111011111100111111010101010";
STP—"00001111011111100111111010110111";
SCN—"00001111011111100111111011001100"; and
ETX—"00001111011111100111111011011101".

Figure 2:
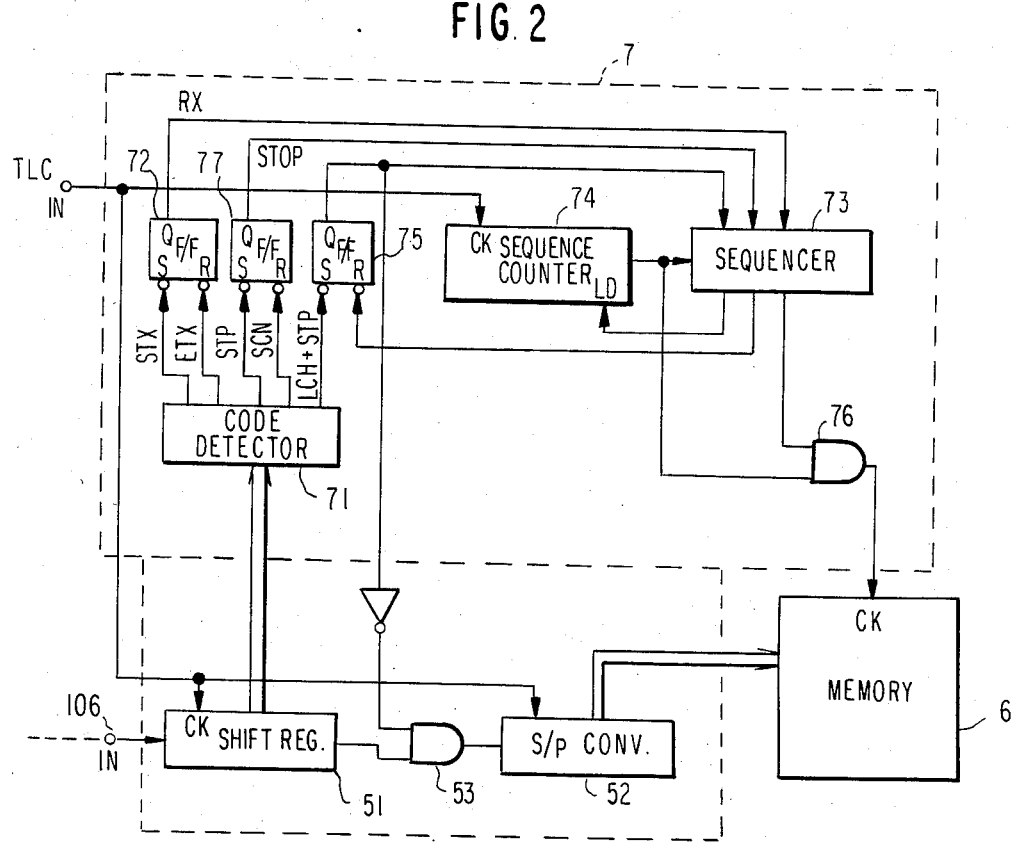

Referring to FIG. 2, the receiving end comprises a code separator 5 for separating the control codes and the video data from the received data applied from a terminal 106, a digital memory 6 for storing the received video data, and a receiving controller 7 for controlling the separator 5 and the memory 7 in response to the received control codes.

The received data is supplied from the terminal 106 to a 32-bit shift register 51. The parallel data of 32 bits in the shift register 51 are supplied to a code detector 71 for detecting the control codes and for supplying the respective code pulses STX, ETX, STP, SCN and LCH at the respective terminals.

In the case where the data has a code format as shown in FIG. 3B, the start code STX is first detected and the code pulse STX is applied to a set terminal of a flip-flop 72 to set it to the receiving state. In the receiving state, a sequencer 73 supplies a load pulse to a sequence counter 74, which is supplied with a transmission line clock TLC. A carry pulse from the counter 74 is supplied through an address generator (not shown) to the digital memory 6 as a word clock to store the received video data, which is passed through the shift register 51 and then serial-to-paralle conterted in a serial-to-parallel converted 52.

When the code LCH is detected, a flip-flop 75 is set to inhibit the passage of the data to the converter 52 by producing an output from inverter 54 which disables an AND circuit 53, and to make the sequencer 73 inhibit the passage of the word clock to the memory by an AND circuit 76, whereby only the video data is stored in the memory 6.

When the code STP is detected, a flip-flop 77 is set to supply a stop signal STOP to the sequencer 73, which generates the control signal for gating the work clock, whereby the storing of the video data is inhibited. When, the code SCN is detected the flip-flop 77 is reset, whereby the inhibiting of the word clock is removed and the storing is restarted.

When the code ETX is detected, the flip-flop 72 is reset, whereby the work clock is inhibited and the storing is stopped.

What is claimed is:

1. A stationary-picture transmission system comprising:
    means for transmitting complete video data over a transmission line, said complete video data representing a stationary-picture and having a plurality of horizontal scanning periods;
    means for producing a stop code, said stop code being transmitted over said transmission line;
    means for temporarily stopping the transmission of said complete video data at a time point during the transmission of said complete video data after said stop code is transmitted over said transmission line, timing of the stopping of the transmission being responsive to said horizontal scanning periods;
    means for producing a restart code, said restart code being transmitted over said transmission line; and
    means for restarting said transmission to complete the transmission of remaining video data in said complete video data after said restart code is transmitted over said transmission line.

2. The system as claimed in claim 1, further comprising:
    means for receiving said complete video data transmitted over said transmission line;
    means for detecting said stop code and said restart code transmitted over said transmission line;
    means for for temporarily stopping the receiving of said complete video data in response to said stop code detected by said detecting means; and
    means for restarting the receiving of said remaining video data in response to said restart code detected by said detecting means.

3. A stationary-picture transmission system for transmitting video data representing a stationary-picture, said system comprising:
    memory means in which said video data are stored, said video data being read out from said memory means and transmitted over a transmission line;
    means for producing first, second and third control codes, said first control code being produced every horizontal scanning period of said video data, said second and third control codes being produced in response to first and second external control signals; means for inserting one of said control codes in said video data; and
    means for inhibiting the transmission of said data when said control codes are inserted.

4. The system as claimed in claim 3, wherein said inhibiting is continued for a predetermined period of time when said first control code is inserted.

5. The system as claimed in claim 3, wherein said inhibiting is continued from the time point of the insertion of said second control code to a time point a predetermined period after insertion of said third control code.

6. The system as claimed in claim 3, further comprising:
   means for detecting said control codes and video data from said transmitted data;
   memory means for storing said detected video data;
   means for inhibiting the storing into said memory means in response to said control codes.

7. The system as claimed in claim 6, wherein said inhibiting of the storing is continued for a predetermined period of time from the detection of said first control code.

8. The system as claimed in claim 6, wherein said inhibiting of the storing is continued from the detection of said second control code to a time point a predetermined period after the detection of said third control code.

* * * * *

UNITED STATES PATENT AND TRADEMARK OFFICE
CERTIFICATE OF CORRECTION

PATENT NO.  :  4,551,767
DATED       :  November 5, 1985
INVENTOR(S) :  Toshiaki HIGASHIGUCHI, et al It is certified that error appears in the above-identified patent and that said Letters Patent is hereby corrected as shown below:

IN THE SPECIFICATION:

Column 4, Line 2, "serial-to-paralle conterted"

should read --serial-to-parallel converted--

Line 13, "work clock" should read

--word clock--

Signed and Sealed this

Twenty-fourth Day of June 1986

[SEAL]

Attest:

DONALD J. QUIGG

Attesting Officer    Commissioner of Patents and Trademarks